US012305838B1

(12) United States Patent
Long

(10) Patent No.: US 12,305,838 B1
(45) Date of Patent: May 20, 2025

(54) ANGLE-ADJUSTABLE SPOTLIGHT

(71) Applicant: Dongguan KJH Lights Co., LTD, Dongguan (CN)

(72) Inventor: Hu Long, Shenzhen (CN)

(73) Assignee: Dongguan KJH Lights Co., LTD, Dongguan (CN)

( * ) Notice: Subject to any disclaimer, the term of this patent is extended or adjusted under 35 U.S.C. 154(b) by 0 days.

(21) Appl. No.: 18/801,668

(22) Filed: Aug. 12, 2024

(51) Int. Cl.
*F21V 21/30* (2006.01)
*F21V 23/00* (2015.01)

(52) U.S. Cl.
CPC ............ *F21V 21/30* (2013.01); *F21V 23/002* (2013.01)

(58) Field of Classification Search
CPC ........ F21V 21/30; F21V 23/002; F21V 21/14; F21V 21/00; F21V 17/02; F21V 19/02; F21V 21/145
See application file for complete search history.

(56) References Cited

U.S. PATENT DOCUMENTS 5,062,029 A * 10/1991 Engel ...................... F21V 23/02 362/427
7,762,688 B2 * 7/2010 Dixon ................ F16M 11/2014 362/427
7,857,492 B2 * 12/2010 Dixon ..................... F21V 21/30 362/419
9,476,576 B2 * 10/2016 Chen ....................... F21V 23/00

* cited by examiner

*Primary Examiner* — Bao Q Truong
(74) *Attorney, Agent, or Firm* — Birchwood IP

(57) ABSTRACT

An angle-adjustable spotlight is provided, which includes a first housing including a first rotating part and a fixed part; one end of the fixed part is provided with an inclined first rotating surface, the first rotating part is fixedly connected to the fixed part; one side of the fixed part is provided with a chute and a clamp hole, a side of the first rotating part is provided with a contact part; a second housing sleeved on the first housing, the second housing includes a second rotating part and a case; the second rotating part is fixedly connected to the case, an inner side of the case is provided with a sliding rail that matches with the chute; the case is further provided with a clamp protrusion, one end of the case is further provided with a second rotating surface; and a lamp head fixed on the fixed part.

8 Claims, 5 Drawing Sheets

ANGLE-ADJUSTABLE SPOTLIGHT

TECHNICAL FIELD

The present disclosure relates to the field of lamps and lanterns technologies, and in particular, to an angle-adjustable spotlight.

BACKGROUND

In the field of lighting equipment, spotlights are an important lighting tool widely used in home, commercial, and artistic lighting scenes.

The adjustment way of traditional spotlights is single and not flexible enough. Some users are accustomed to holding the middle and rotating the tail of the lamp for adjustment, some users are accustomed to holding the tail of the lamp and rotating the middle for adjustment, and some users are accustomed to adjusting with both hands simultaneously. The existing adjustment ways of spotlights cannot meet the needs of the users at the same time.

SUMMARY

In view of the above situation, it is necessary to provide an angle-adjustable spotlight that solves at least one of the above problems, the angle-adjustable spotlight includes:

- a first housing, which includes a first rotating part and a fixed part; one end of the fixed part is provided with an inclined first rotating surface, the first rotating part is fixedly connected to the fixed part; one side of the fixed part is provided with a chute and at least one clamp hole; a side of the first rotating part is provided with a contact part;
- a second housing sleeved on the first housing, the second housing includes a second rotating part and a case, the second rotating part is fixedly connected to the case, an inner side of the case is provided with a sliding rail that matches with the chute, the case is further provided with a clamp protrusion that matches with the clamp hole; one end of the case is further provided with a second rotating surface with a same inclined angel with the first rotating surface; and
- a lamp head fixed on the fixed part.

In an embodiment of the present disclosure, a threaded hole is provided on a connection surface between the fixed part and the lamp head.

In an embodiment of the present disclosure, the case is further provided with two limit pieces in opposite positions, and a limit notch is provided on the limit pieces.

In an embodiment of the present disclosure, one side of the lamp head is provided with at least one limit block, and the limit block(s) matches with the limit notches.

In an embodiment of the present disclosure, the first rotating surface is provided with an angle marker, and the second rotating surface is provided with an observation hole.

In an embodiment of the present disclosure, the first housing is further provided with a wired hole.

In an embodiment of the present disclosure, the angle-adjustable spotlight further includes a spotlight housing, which is sleeved on the second housing.

In an embodiment of the present disclosure, the first rotating part is hollow.

Numeral reference: 1—first housing; 11—first rotating part; 12—fixed part; 121—chute; 122—clamp hole; 123—threaded hole; 13—first rotating surface; 14. angle marker; 15—wired hole; 16—contact part; 2—second housing; 21—second rotating part; 22—case; 221—sliding rail; 222—clamp protrusion; 23—second rotating surface; 24—limit piece; 241—limit notch; 25—observation hole; 3—lamp head; 31—limit block; 4—spotlight housing.

DESCRIPTION OF EMBODIMENTS

In order to clarify the purpose, technical solution, and advantages of the present disclosure, an angle-adjustable spotlight of the present disclosure will be further described in detail with reference to the accompanying drawings and embodiments. It should be understood that the specific embodiments described herein are only for explaining the present disclosure and are not intended to limit the present disclosure.

In the description of the present disclosure, unless otherwise specified, "a plurality of" means two or more; terms "center", "vertical", "horizontal", "up", "down", "left", "right", "inside", "outside", "front", "rear", "head", "tail", "upright", "crosswise", "top", "bottom", "inside", "outside" and other directional or positional relationships indicated are based on the directional or positional relationships shown in the accompanying drawings and are only for the convenience of describing the present disclosure and simplifying the description, and do not indicate or imply that the device or element referred to must have a specific orientation, be constructed and operated in a specific orientation, and therefore cannot be understood as limiting the present disclosure. In addition, terms "first", "second", "third", etc. are only used for descriptive purposes and cannot be understood as indicating or implying relative importance.

In the description of the present disclosure, it should be noted that unless otherwise specified and limited, terms "installation", "connection to", and "connection with" should be broadly understood, for example, they can be a fixed connection, a detachable connections, or an integral connection; it can be a mechanical connection or an electrical connection; it can be directly connected, indirectly connected through an intermediate medium, or connected internally between two components. For those skilled in the art, the specific meanings of the above terms in this specification can be understood through a specific situation.

Figure 1:
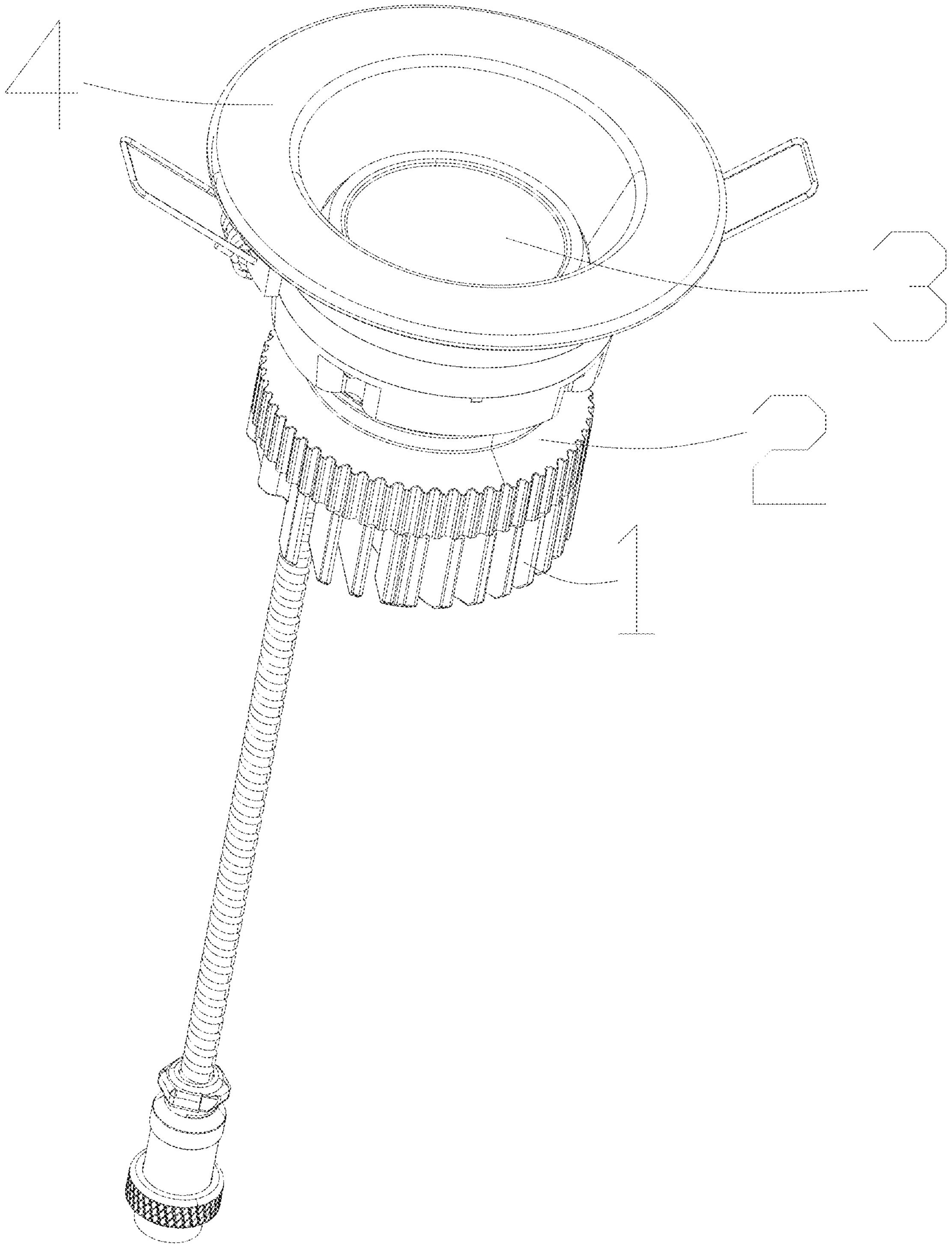
FIG. 1 is a schematic structural diagram of an adjustable angle spotlight according to an embodiment of the present disclosure.
Figure 2:
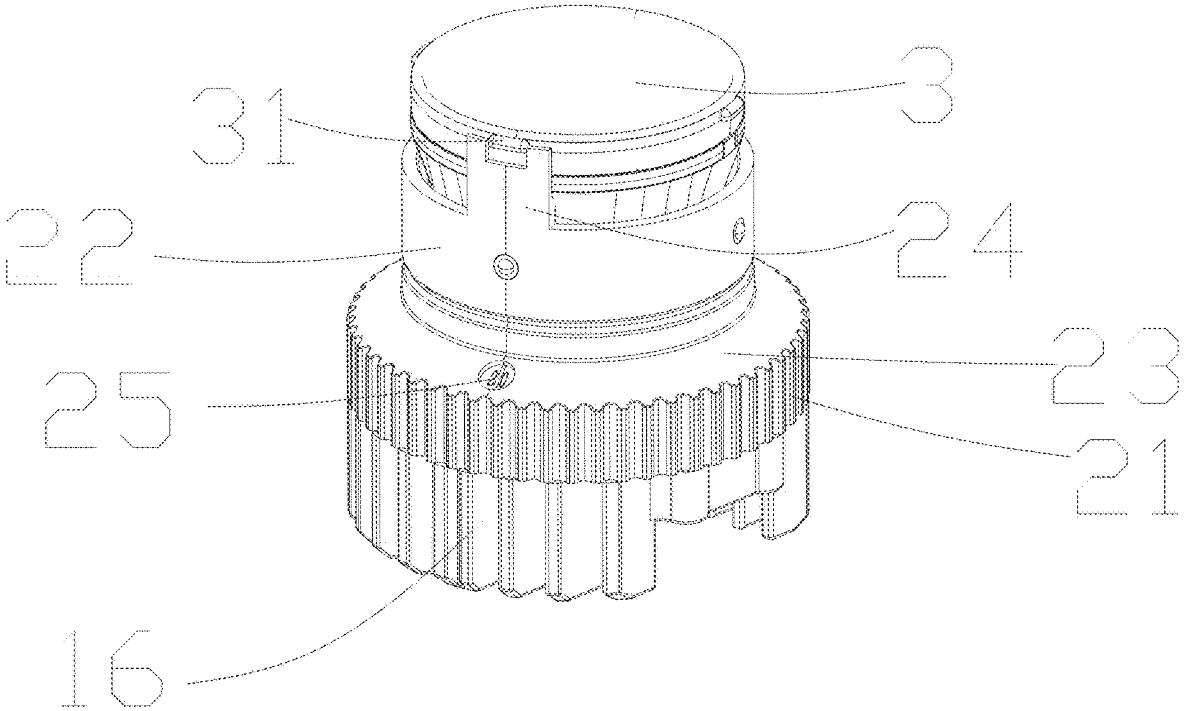
FIG. 2 is a schematic structural diagram of a first housing, a second housing, and a lamp head according to an embodiment of the present disclosure.
Figure 3:
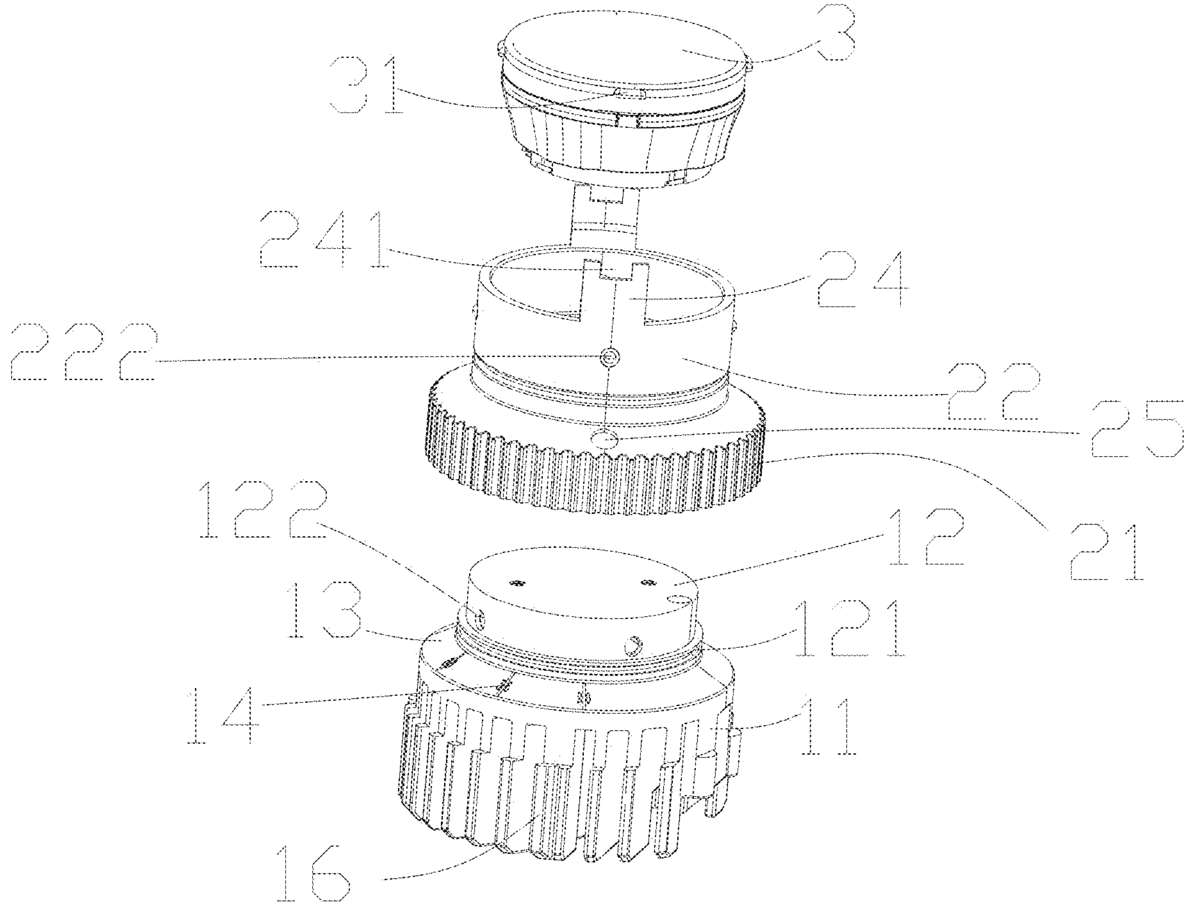
FIG. 3 is an exploded view of the first housing, the second housing, and the lamp head according to an embodiment of the present disclosure.
Figure 4:
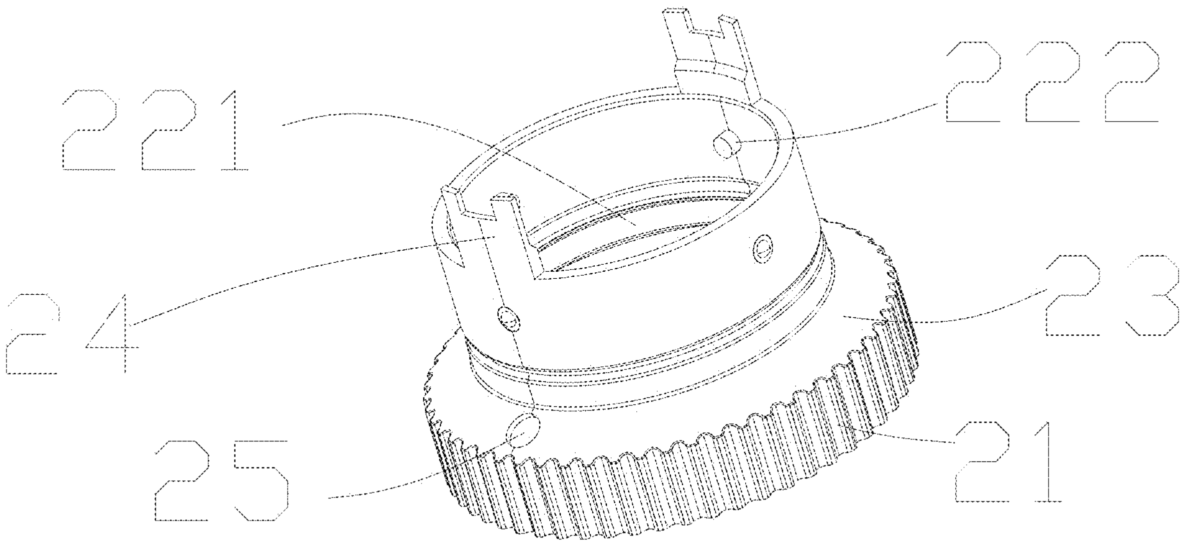
FIG. 4 is a schematic structural diagram of the second housing according to an embodiment of the present disclosure.
Figure 5:
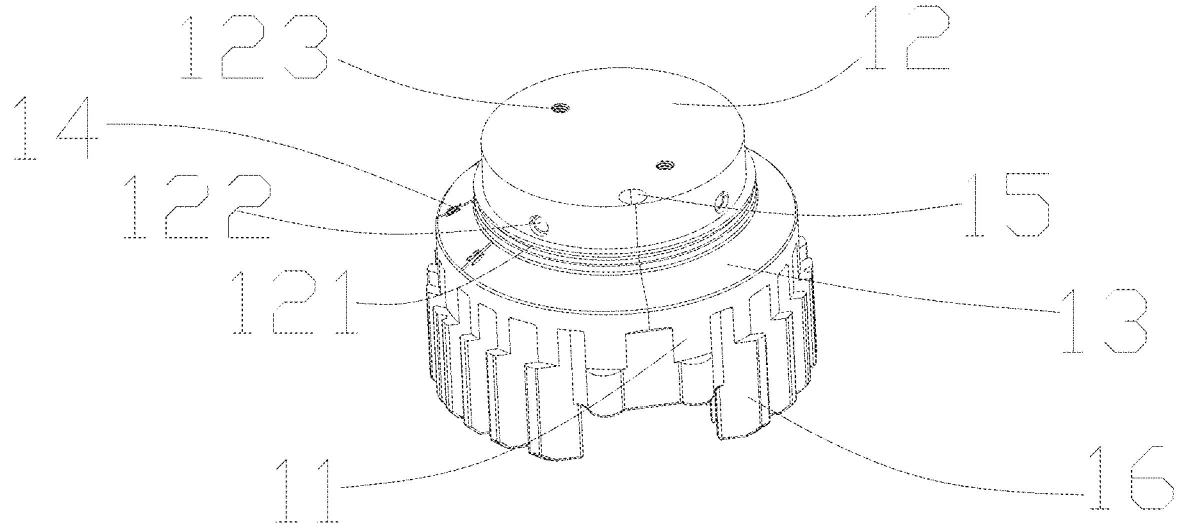
FIG. 5 is a schematic structural diagram of the first housing according to an embodiment of the present disclosure.

Please refer to FIGS. 1 to 5. The adjustable angle spotlight according to an embodiment of the present disclosure includes a first housing 1 including a first rotating part 11 and a fixed part 12, one end of the fixed part 12 is provided with an inclined first rotating surface 13, the first rotating part 11 is fixedly connected to the fixed part 12, one side of the fixed part 12 is provided with a chute 121 and at least one clamp hole 122, a side of the first rotating part 11 is provided with a contact part 16; a second housing 2 sleeved on the first housing 1, the second housing 2 includes a second rotating part 21 and a case 22; the second rotating part 21 is fixedly connected to the case 22; an inner side of the case 22 is provided with a sliding rail 221 that matches with the chute 121; the case 22 is further provided with a clamp protrusion 222 that matches with the clamp hole 122; one end of the case 22 is further provided with a second rotating surface 23 with a same inclined angle with the first rotating surface 13; and a lamp head 3 fixed on the fixed part 12.

In this embodiment, the design of this structure aims to achieve a flexible rotational connection between the first housing 1 and the second housing 2, while ensuring that a relative angle between a light source on the lamp head 3 and a mirror surface can adjust with the rotation of the first housing 1 to meet different lighting requirements. The first housing 1 is composed of the first rotating part 11 and the fixed part 12. One end of the fixed part 12 is provided with the inclined first rotating surface 13 as a reference surface for rotational connection. The first rotating part 11 is fixedly connected to the fixed part 12, thereby forming an integral structure. The design of the chute 121 and the clamp hole 122 on one side of the fixed part 12 provides precise position guidance for installation and locking of the second housing 2. A contact part 16 is provided at a side of the first rotating part 11, serves as a limiting device when the second housing 2 is inserted, thereby ensuring that an insertion depth is appropriate. The second housing 2 includes the second rotating part 21 and the case 22, which are fixedly connected so as to form a whole. The inner side of the case 22 is provided with the sliding rail 221 that matches with the chute 121 of the first housing 1, thereby ensuring that the second housing 2 can smoothly slide along the chute 121 to a predetermined position. The clamp protrusion 222 on the case 22 can be inserted into the clamp hole 122 of the first housing 1 when sliding to a specific position, achieving a stable connection between the two. The second rotating surface 23 at one end of the case 22 has a same inclination angle consistent with the first rotating surface 13, ensuring the tightness and smoothness of the rotational connection. When the second housing 2 is sleeved on the first housing 1, the case 22 is sleeved on an outside of the fixed part 12, and the first rotating surface 13 is tightly adhered to the second rotating surface 23, thereby forming a rotating connection interface. The first rotating part 11 is connected to an upper half of the second rotating part 21, and its bottom surface is in contact with the contact part 16. This design not only limits the insertion depth of the second housing 2, but also provides a support point during rotation. As the sliding rail 221 slides in the chute 121, when it reaches the predetermined position, the clamp protrusion 222 automatically inserts into the clamp hole 122, thereby completing the installation and locking process. Due to a fixed position of the lamp head 3 on the fixed part 12, when the first housing 1 rotates, the lamp head 3 will also rotate at the same angle. A user can change the angle of the first housing 1 relative to the second housing 2 by rotating the first rotating part 11 according to his personal habits or lighting needs, or adjust a relative angle between the second housing 2 and the first housing 1 by rotating the second rotating part 21 so as to achieve more flexible change in the angle light beams of the lamp head 2 in order to enhance the intensity of the illumination. Besides, the user can simultaneously rotate the first rotating part 11 and the second rotating part 21 in opposite directions to change the relative angle between the two, thereby achieving more flexible lighting angle adjustment. This design not only improves the convenience of use, but also enhances the adaptability and practicality of the product.

Please refer to FIGS. 1 to 5. In an implementation, a threaded hole 123 is provided on a connection surface between the fixed part 12 and the lamp head 3.

In this embodiment, the lamp head 3 is tightly connected to the threaded hole 123 on the fixed part 12 through a corresponding threaded structure at its bottom, thereby forming a stable fixing method. This connection way not only ensures the stability of the lamp head 3 during use, but also facilitates the installation and replacement of the lamp head 3.

Please refer to FIGS. 1 to 5. In an implementation, the case 22 is further provided with two limit pieces 24 in opposing positions, and a limit notch 241 is provided on the limit pieces 24. A side of the lamp head 3 is provided with at least one limit block 31, the limit block 31 matches with the limit notches 241.

In this embodiment, the case 22 is designed with two limit pieces 24 inside at opposite positions, and each limit piece 24 includes a specific limit notch 241, the limit notch 241 is configured to cooperate with the limit block 31 on the side of the lamp head 3. There are one or more limit blocks 31 on the side of lamp head 3, the limit blocks 31 are pre-positioned at a commonly used lighting angle by the user for quick positioning and adjustment. When the second housing 2 is assembled with the first housing 1, and the lamp head 3 is allowed to rotate freely to adjust the lighting angle, the user rotates the lamp head 3 to a desired position. During the rotation process, if the limit block 31 aligns perfectly with the limit notch 241 of a certain limit piece 24 on the case 22, the limit block 31 will automatically be clamped into the notch. At this time, the user will have an abrupt feeling, and this intuitive feedback mechanism allows the user to immediately know that the lamp head 3 has reached a preset stable angle. This design not only simplifies the process of adjusting the angle of the lamp head 3, thereby improving the accuracy and efficiency of adjustment, but also ensures the stability of the lamp head 3 at common angles through physical limits, avoiding angle deviation caused by slight touch or vibration, and enhancing the user experience.

Please refer to FIGS. 1 to 5. In an implementation, the first rotating surface 13 is provided with an angle marker 14, and the second rotating surface 23 is provided with an observation hole 25.

In this embodiment, the angle marker 14 is provided on the first rotating surface 13, the angle markers are uniformly distributed at certain angular intervals to indicate a rotation angle of the first housing 1 relative to a certain reference position. At the same time, the observation hole 25 is provided on the second rotating surface 23, so that the user can clearly see the angle mark 14 on the first rotating surface 13. The principle of this design is that when the user needs to accurately adjust the lighting angle of the lamp head 3, the relative position between the first housing 1 or the second housing 2 can be changed by rotating them. During the rotation process, the user can directly observe the angle marker 14 on the first rotating surface 13 through the observation hole 25 on the second rotating surface 23, thereby obtaining real-time information on a current rotation angle.

Please refer to FIGS. 1 to 5. In an implementation, the first housing 1 is further provided with a wired hole 15.

In this embodiment, smooth connection of necessary cables such as external power lines or signal lines is allowed.

Please refer to FIGS. 1 to 5. In an implementation, the angle-adjustable spotlight further includes a spotlight housing 4, the spotlight housing 4 is sleeved on the second housing 2.

In this embodiment, the spotlight housing 4 is designed to be sleeved on the outside of the second housing 2 to enhance an illumination effect, thereby improving the focusing and directionality of light.

Please refer to FIGS. 1 to 5. In an implementation, the first rotating part is hollow.

In this embodiment, the principle of this structure is to reduce an overall weight by removing some materials.

The above description is only the preferred embodiments of the present disclosure and does not limit the present disclosure in any form. Although the present disclosure has been disclosed in preferred embodiments, it is not intended to limit the present disclosure. Any skilled person in the art who is familiar with this field can use the disclosed technical content to make slight changes or modifications to equivalent embodiments without departing from the scope of the technical solution of the present disclosure. Any simple modifications, equivalent changes, and modifications made to the above embodiments based on the technical essence of the present disclosure without departing from the technical solution of the present disclosure still belong to the scope of the technical solution of the present disclosure.

What is claimed is:

1. An angle-adjustable spotlight, comprising:

a first housing, which comprises a first rotating part and a fixed part; one end of the fixed part is provided with an inclined first rotating surface, the first rotating part is fixedly connected to the fixed part; one side of the fixed part is provided with a chute and at least one clamp hole; a side of the first rotating part is provided with a contact part;

a second housing sleeved on the first housing, the second housing comprises a second rotating part and a case, the second rotating part is fixedly connected to the case, an inner side of the case is provided with a sliding rail that matches with the chute, the case is further provided with a clamp protrusion that matches with the clamp hole; one end of the case is further provided with a second rotating surface with a same inclined angel with the first rotating surface; and a lamp head fixed on the fixed part.

2. The angle-adjustable spotlight according to claim 1, wherein a threaded hole is provided on a connection surface between the fixed part and the lamp head.

3. The angle-adjustable spotlight according to claim 1, wherein the case is further provided with two limit pieces in opposite positions, and a limit notch is provided on the limit pieces.

4. The angle-adjustable spotlight according to claim 3, wherein one side of the lamp head is provided with at least one limit block, and the limit block(s) matches with the limit notches.

5. The angle-adjustable spotlight according to claim 1, wherein the first rotating surface is provided with an angle marker, and the second rotating surface is provided with an observation hole.

6. The angle-adjustable spotlight according to claim 1, wherein the first housing is further provided with a wired hole.

7. The angle-adjustable spotlight according to claim 1, further comprises a spotlight housing, which is sleeved on the second housing.

8. The angle-adjustable spotlight according to claim 1, wherein the first rotating part is hollow.

* * * * *